(12) United States Patent  
Guillama et al.

(10) Patent No.: US 11,942,002 B2  
(45) Date of Patent: Mar. 26, 2024

(54) PERSONAL AUGMENTED REALITY

(71) Applicant: The Quantum Group, Inc., Lake Worth, FL (US)

(72) Inventors: Noel J. Guillama, Wellington, FL (US); Chester A. Heath, Boca Raton, FL (US)

(73) Assignee: THE QUANTUM GROUP, INC., Lake Worth, FL (US)

(*) Notice: Subject to any disclaimer, the term of this patent is extended or adjusted under 35 U.S.C. 154(b) by 0 days.

(21) Appl. No.: 17/863,148

(22) Filed: Jul. 12, 2022

(65) Prior Publication Data

US 2022/0343814 A1 Oct. 27, 2022

Related U.S. Application Data

(63) Continuation of application No. 16/883,042, filed on May 26, 2020, now Pat. No. 11,417,247, which is a continuation of application No. 16/165,823, filed on Oct. 19, 2018, now Pat. No. 11,417,246.

(60) Provisional application No. 62/574,517, filed on Oct. 19, 2017.

(51) Int. Cl.
| | |
|---|---|
| *G09F 19/12* | (2006.01) |
| *G06T 11/00* | (2006.01) |
| *H04B 10/112* | (2013.01) |
| *H04M 1/72403* | (2021.01) |
| *H04M 1/72427* | (2021.01) |

(52) U.S. Cl.
CPC .............. *G09F 19/12* (2013.01); *G06T 11/00* (2013.01); *H04B 10/1121* (2013.01); *H04M 1/72403* (2021.01); *H04M 1/72427* (2021.01)

(58) Field of Classification Search
CPC ..... G09F 19/12; G06T 11/00; H04B 10/1121; H04B 10/116; H04M 1/72403; H04M 1/72427

See application file for complete search history.

(56) References Cited

U.S. PATENT DOCUMENTS

| | | |
|---|---|---|
| 7,850,067 B1 | 12/2010 | Persson |
| 9,262,954 B2 | 2/2016 | Oshima |
| 9,432,421 B1 | 8/2016 | Mott |
| 9,495,783 B1 | 11/2016 | Samarasekera |
| 9,853,740 B1 | 12/2017 | Bortz |
| 10,007,928 B2 | 6/2018 | Graham |
| 10,008,039 B1 | 6/2018 | Neustein |
| 10,303,945 B2 | 5/2019 | Aoyama |
| 2008/0007645 A1 | 1/2008 | McCutchen |
| 2009/0061901 A1 | 3/2009 | Arrasvuori |
| 2012/0059720 A1 | 3/2012 | Musabji |
| 2012/0194547 A1 | 8/2012 | Johnson |
| 2012/0201472 A1 | 8/2012 | Blanchflower |

(Continued)

FOREIGN PATENT DOCUMENTS

IN 3372/CHE/2014 A 2/2016

*Primary Examiner* — Ryan R Yang

(74) *Attorney, Agent, or Firm* — NIXON PEABODY LLP

(57) ABSTRACT

The present disclosure provides systems and methods for enabling Personal Augmented Reality (PAR). PAR can include an emitor configured to receive data signals and emit the data signals as light signals. PAR can further include a smart device configured to receive the light signals emitted by the emitor. The smart device can process the light signals to yield a communication and display the communication on a screen.

20 Claims, 7 Drawing Sheets

(56) References Cited

U.S. PATENT DOCUMENTS

| | | |
|---|---|---|
| 2013/0050258 A1 | 2/2013 | Liu |
| 2013/0162817 A1 | 6/2013 | Bernal |
| 2014/0139519 A1 | 5/2014 | Mit |
| 2014/0205136 A1 | 7/2014 | Oshima |
| 2014/0280316 A1 | 9/2014 | Ganick |
| 2015/0106195 A1 | 4/2015 | Holman |
| 2015/0109338 A1 | 4/2015 | McKinnon |
| 2015/0206349 A1 | 7/2015 | Rosenthal |
| 2017/0064609 A1 | 3/2017 | Park |
| 2018/0300341 A1 | 10/2018 | Hadar |
| 2020/0015900 A1* | 1/2020 | Scheib .................. A61B 34/30 |
| 2020/0120458 A1 | 4/2020 | Aldana |

* cited by examiner

Reality

Augmented Reality View

PERSONAL AUGMENTED REALITY

CROSS-REFERENCE TO RELATED APPLICATIONS

This application is a continuation of U.S. application Ser. No. 16/883,042, filed May 26, 2020, now allowed, which is a continuation of U.S. application Ser. No. 16/165,823, filed on Oct. 19, 2018, now allowed, which claims priority to and the benefit of U.S. Provisional Patent Application No. 62/574,517, filed on Oct. 19, 2017, each of which is hereby incorporated by reference herein in its entirety.

FIELD

The present disclosure relates to the field of electronic communications via augmented reality.

BACKGROUND

Virtual Reality (VR) and Augmented Reality (AR) are evolving as a new means of communication between businesses and their consumer customers. Personal extension of a person's intelligence, in the form of smart phones, cameras, and other mobile devices, has become a ubiquitous element of the world. People commonly carry a collection of items: keys, glasses, wallets, pens, and similar items. At a minimum, these items allow individuals to augment and extend individual abilities to gain access to secure areas, see more accurate information, purchase things and/or provide identity, record information, and/or acknowledge personal presence and approval. The smart phone is emerging as one item to collectively perform all of these functions.

Generically, the smart phone is really "AIK" for "augmented intelligence and knowledge", where human intelligence and knowledge may be extended further by connection to the Internet. Indeed, AIK may take the form of a camera, eyeglasses, or other wearable technology; and in time, AIK may even be physically embedded in consumers. AIK has evolved slowly and subtly, but has already become a major element of social change, similar to the printing press and other inventions emblematic of individual freedoms that preceded the smart phone.

Specifically, Augmented Reality (AR), in the smart phone, can replace signage by noting the presence, position, and perspective of a camera, and then providing labels for items detected by the camera. The labels typically originate from a central database, most likely as connected from an Internet cloud. Advertisers, especially web giants have seen a lucrative opportunity in providing databases for augmented reality, and thereby becoming the intermediaries in commerce. However, history has shown that when a government or other large entities create a monopoly on the emission of knowledge, the individual suffers.

The independent individual is largely excluded from the emerging AR vision; however, such an individual can wish to emit or receive opinions and information, as a first amendment right and without the "assistance" of an intermediary.

Therefore, what is needed is a system or method to preserve an individual's right to emit and receive selected opinions, free of the obtrusive intervention of outsiders.

SUMMARY

The present disclosure provides systems and methods to enable communication between AIK devices and external emitters.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The accompanying drawings exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Figure 1A:
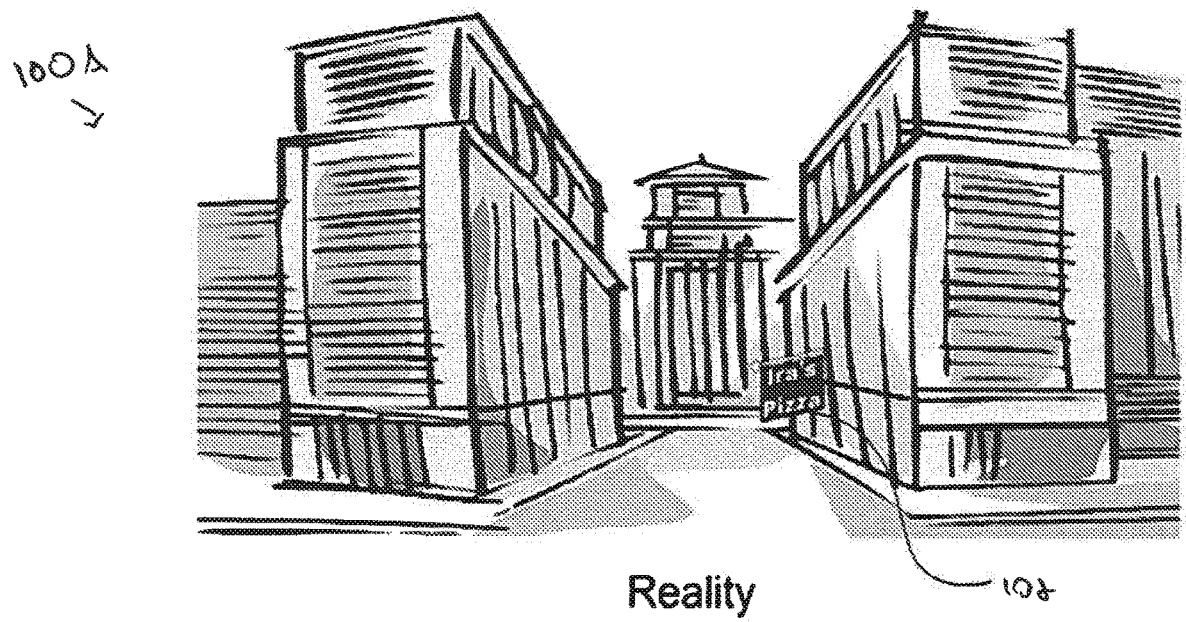
FIGS. 1A-1B show schematic drawings of exemplary differences between reality and augmented reality, according to an embodiment of the present disclosure.

The present invention is described with reference to the attached figures, where like reference numerals are used throughout the figures to designate similar or equivalent elements. The figures are not drawn to scale, and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present disclosure provides for a "Personal Augmented Reality" (PAR), which can allow individuals to exercise greater control over the communication received by an AIK. PAR can be independent of a central database, but can still integrate with a central database. An individual can still create a sign, advertise, or assert their right to use any of the functions of a mobile device or other similar technology. PAR allows a user to choose to see preferred advertisements or other emitted signals and to block undesired advertisements or emitted signals. According to an embodiment of the present disclosure, an individual can set up a filter or other similar means to selectively view signals/communications according to the individual's personal preferences.

The present disclosure provides systems and methods for enabling Personal Augmented Reality (PAR). PAR can include an emitor configured to receive data signals and emit the data signals as light signals. PAR can further include a smart device configured to receive the light signals emitted by the emitor. The smart device can process the light signals to yield a communication and display the communication on a screen.

FIG. 1A shows an exemplary view 100A of a world without AR. In such a world 100A, any business location 102 can advertise with visual media. For example, FIG. 1A demonstrate Ira's pizza advertising with a sign.

Figure 1B:
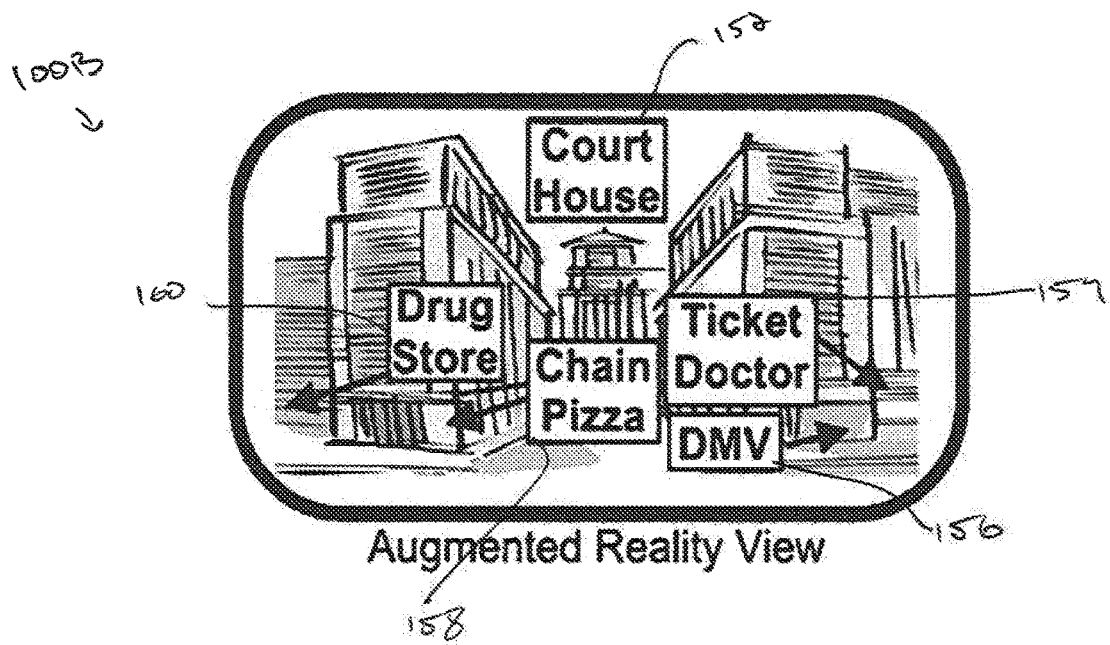

FIG. 1B shows an exemplary view 100B of a world impacted by augmented reality where a plurality of advertisements 152, 154, 156, 158, and 160 obscure the view 100B of the world. In such a world 100B, Ira's Pizza 102 of FIG. 1A can be obscured by the AR advertisements. Although the present disclosure refers to advertisements with respect to 152, 154, 156, 158, and 160, any type of visual, audio, or electronic communication can be envisioned for the purposes of the present disclosure. These advertisements 152, 154, 156, 158, and 160 can be emitted by the individual business enterprises themselves. In some instances, there can be a central database of advertisements where individual business enterprises can purchase advertisement space.

FIG. 1B shows how the impact of AR on signage can be to de-prioritize the individual business (Ira's Pizza 102 from FIG. 1A) that does not pay to be included in the central databases relative to corporate chains that do pay, or pay handsomely.

Consider the following scenario. Ira's Pizza 102 was established in 1947 and has been a fixture in the courthouse square for decades. Their original Israeli Pizza is so good, that they have never had to advertise. Recently, a chain pizza house 158 has arrived in the neighborhood and they advertise through the AR corporate conglomerates. In the Internet search, Ira's Pizza 102 is listed on page 31, behind all the pizza chains. Ira's Pizza 102, cannot afford to advertise, so it is not included in the AR listing, and its physical label 102 is obliterated by the more prominent listings. If you do not believe this, do a search on any major engine for Ira's Pizza, or Ivy's Pizza or Leo's Pizza. Paid Advertising is often first on the list of the search results.

Indeed, because of the revenue potential, unless suppressed, advertising overlay, as shown in FIG. 1B, can become the default for AR, like banner ads on web pages. More subtly, physical signs which include icons, or images that evoke innate human emotional response, like "kindchenschema" for baby care services, can be lost in the shuffle. Indeed, it is this attractive attribute of child-like facial features, called Kawaii in Japanese, that makes the characters in Pokemon Go such an impulsive activity. Imagine an AR game, such as Pokemon Go, obliterated by visual clutter of spurious signs or virtual billboards that block scenic views of the game.

Therefore, the present disclosure attempts to solve the problems with AR advertising. The present disclosure provides systems and methods for individual business enterprises to advertise their products. The present disclosure provides for Personal Augmented Reality (PAR) which includes an emitor (discussed with respect to FIG. 2) and a PAR Application (discussed with respect to FIG. 3).

Figure 2:
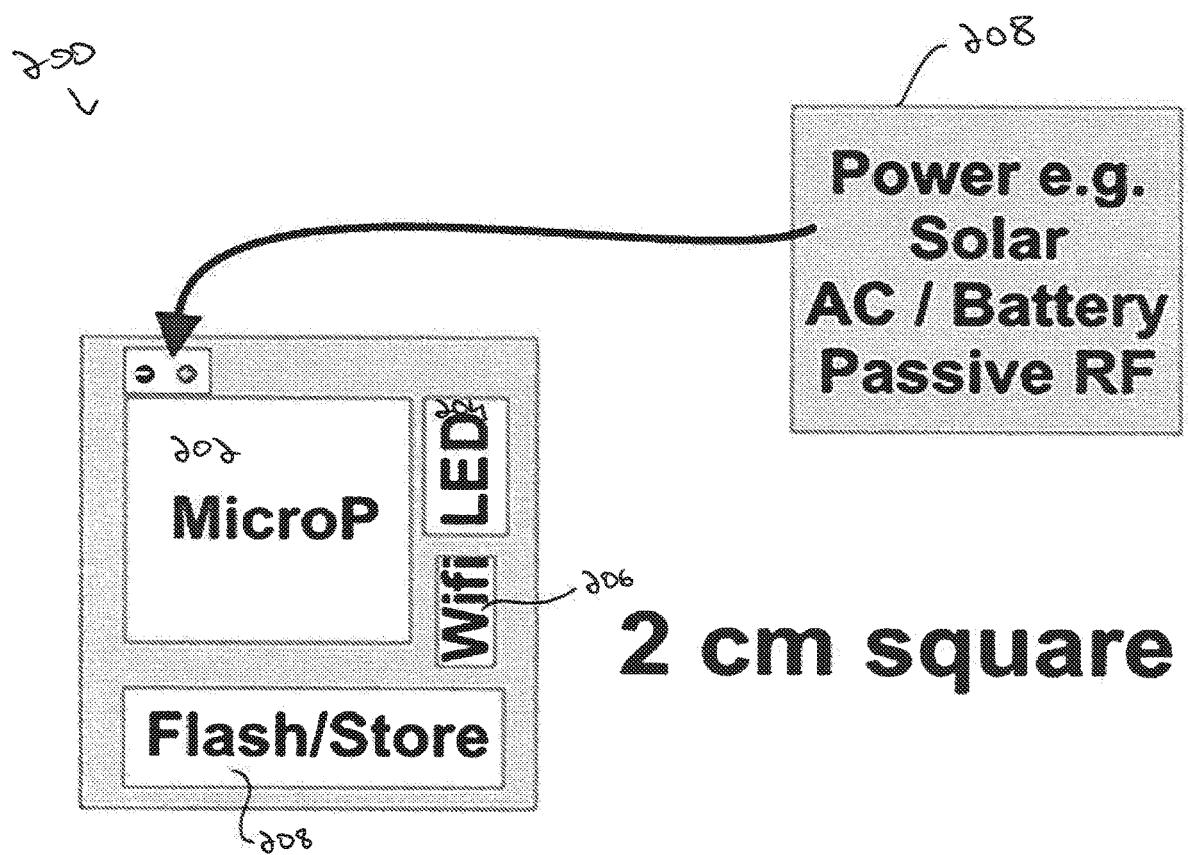
FIG. 2 shows an exemplary emitor system, according to an embodiment of the present disclosure.

FIG. 2 shows an exemplary circuit board 200 which acts as an "emitor", according to an embodiment of the present disclosure. The circuit board 200 can act as an "emitor" (deliberately misspelled to distinguish it from the element of a transistor) to emit an intelligent string of digital information from a light source.

The circuit board 200 can include a microprocessor 202; an LED 204; a Wi-Fi receiver 206; a flash memory 208; and a power source 210. For example, the microprocessor 202 can be a low power microprocessor, for example, of the type often used on greeting cards. The LED 204 can send light signals. The Wi-Fi receiver 206 can receive wireless signals. The flash memory 208 can hold data received from the Wi-Fi receiver 206 if necessary. The board 200 is powered by a power source 210; the power source 210 can include batteries (AC or solar batteries, RF energy captured from the air, a transponder, or any other appropriate power source as known in the art. Circuit board 200 can act as an emitor, according to an embodiment of the present disclosure.

A small emitor communication can be loaded from a network interface via Wi-Fi onto the circuit board 200. The communication can provide instructions for the LED to emit a coded optical sequence. The emitor can therefore (1) use the Wi-Fi to function as a relay, (2) train other emitors to relay bridge connections, (3) coordinate messaging, or (4) perform other similar tasks. There are numerous derivations of this concept, as discussed later with respect to FIGS. 4, 5, and 7.

An emitor can be an optical broadcaster that provides digitally-encoded information in a light source (such as LED 204). In the various examples of the present disclosure, the light source can also be a bright unidirectional or omnidirectional LED, a low power laser (with or without a diffuser). Low power lasers can allow information to be directed to a specific area. Emitors can be typically small and can be visible through a window, on jewelry, on a badge, on a business card, or many other locations as known by a person with appropriate skill in the art. In some examples, emitors can be mounted on aircrafts, drones, balloons, earth satellites, or other airborne vehicles. The emitors can be directed to a given area on the ground. Emitors can be used underwater as well, such as for the location of navigational markers.

Many emitors, according to the various embodiments of the present disclosure, can operate at a default slow speed. This can have the appearance of twinkling lights on buildings. Visibility can be avoided by using IR or near IR light. Cameras can be sensitive to IR or near IR light but an individual's eyes can typically not see such light. A master emitor, can define a filter attribute for many other emitors, such that multiple emitors could be designated to coordinate for more data.

Figure 3A:
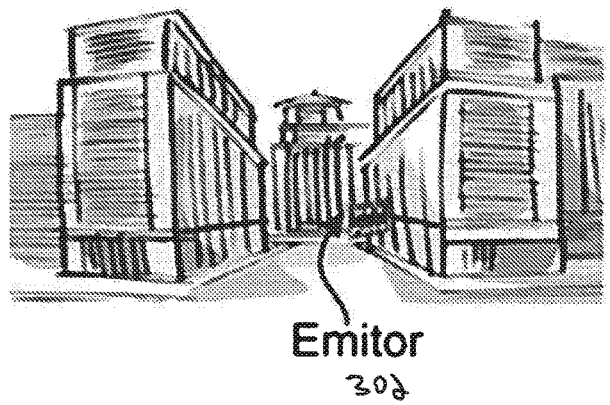
FIGS. 3A-3B show exemplary use of an emitor, according to an embodiment of the present disclosure.

FIG. 3A provides an exemplary implementation 300A of an emitor circuit board (such as the emitor 200 of FIG. 2). The implementation can include an emitor 302 at a location. For example, the emitor 302 can be displayed out of the window of Ira's Pizza 102.

Figure 3B:
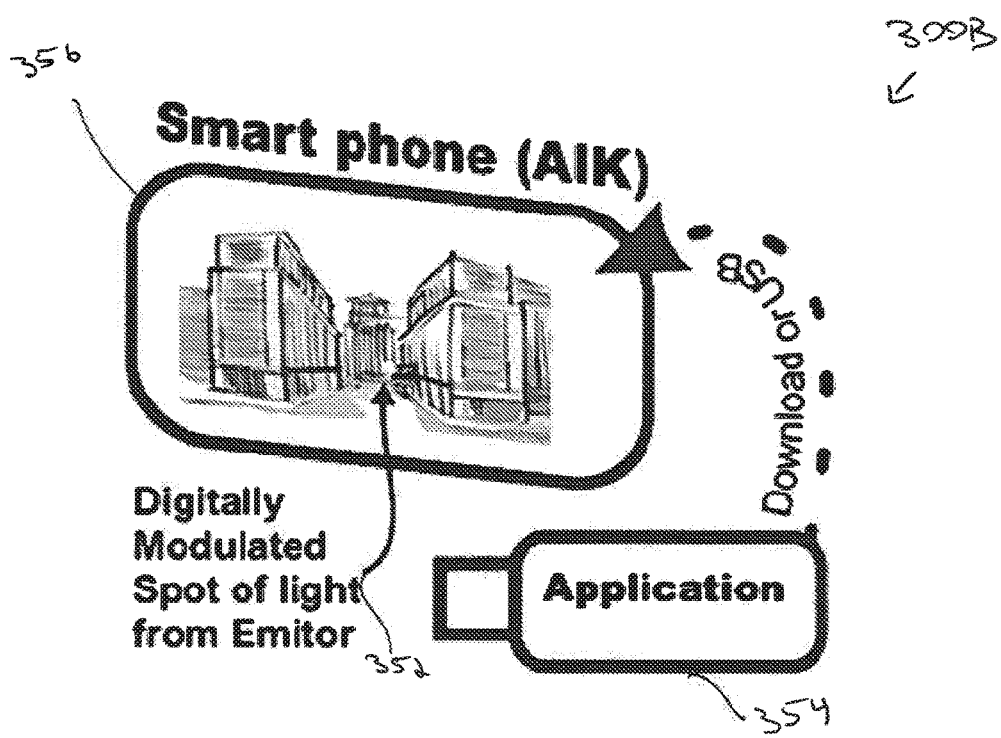

FIG. 3B shows an exemplary smart device PAR integration system 300B, according to an embodiment of the present disclosure. System 300B can include an emitor 352; an application 354; and a smart device 356.

The PAR application 354 can integrate with a camera, smart phone, or other AIK device (for example, smart device 356). A camera on the smart device 356 can detect a scene and provide a stabilized image. The application 354 selects a pel, or group of pels, from the stabilized image and detects a digital sequence. The pel, or group of pels, can be detected from the light emitted from an emitor 352 (the emitor can be as provided for with respect to emitor 200 of FIG. 2). The digital sequence can then be assembled as a label and presented on the screen of the AIK device 356. Such a digital sequence can, for example, be a data transmission which contains display instructions. The PAR application 354 can detect specialized pels configured specifically for integration with the PAR application 354. the PAR application 354 can also be configured to receive all AR advertisements in a field of view of the camera.

The user may select in the application 354 for certain filtering, such that particular PAR messages can be prioritized over other AR labels. In some examples, PAR specific images can be integrated with an existing field of AR labels; in other examples, only the PAR messages can be shown. Any combination can be provided for selecting or discarding images. The PAR labels can also be filtered for interest, say a filter for the word "Pizza" or the term "Ira's Pizza". Indeed, the PAR message can be unlimited in length and may include long or unlimited, descriptions that may be delivered to the user as text or images.

Therefore, PAR application 354 can provide a means to filter images based on content. For example, images can be filtered based on their independence, the importance of an image, priorities set by centralized labeling (in either AR or PAR). Such performance can preserve the esthetics and originality of a scene, and can even make augmented reality perception safer. In some examples, there can be zones or a particular AR image that suppresses labeling, advertisements, or other signage in lieu of traffic and safety warning signs. PAR could offer the concept of "clear labels" that are transparent areas by default and set as a highest priority in filtering, to guarantee access to safety signals. Generally, filtering can come from a list of objects that are permitted and a list of objects that can be suppressed. In some embodiments of the present disclosure, filters can be provided for any preferred content type (e.g. pizza).

In other examples of the PAR application 354, the light source 352 can appear in the camera view as a brighter speck that may resemble twinkling dot of light, when operated with low data rates. The data rate can initially be slow, so as to allow one bit of information from each pel, or group of pels, per frame of video. In some examples, this can be 30 frames per second (for NSTC standard/25 for PAL) yielding approximately 40 seconds to accumulate the amount of information in a "tweet" format (140 characters) or in less than a minute. A short label can be approximately 2 seconds. The slow data rate can be acceptable for the purpose of labeling. Much faster data rates can be possible with camera image detectors operating at high data rates. Although faster camera image detectors are not common in conventional smart phones, the present disclosure provides that the smart device 356 can be any range of technologies which include a camera. For example, higher end digital cameras can provide superior optics to select emitors at long range. The features of higher end cameras can trickle down to smart phones over time, especially if faster refresh is desirable for slow motion capture.

The PAR application 354 can run in the smart device 356. The local intelligence can stabilize the image and can isolate a section that includes the emitor source. While the data rate per pel may be low, there are many pels on the camera image detector and several streams of optical data that can be received simultaneously. For example, in a 10 mega pixel stabilized image detector, 100, perhaps 1000 or more, different streams can potentially be isolated with good optics, auto-correlation of adjacent pels, and stabilization. In use, all of this information can be gathered in a short time period. In some examples, the time period for gathering the information can be a similar to the length of time for a time exposure or the length of an HDR image capture. The intelligent AIK can then select the relevant information, or aggregate long strings from multiple coordinated emitors into one message. Through this means, one could identify a single individual in a room from hundreds of other individuals.

It is envisioned that the application 354 can be given away as a free download and the Emitor could be sold at cost in order to establish a standard. For example, the application 354 can be provided on a USB so that the application 354 is operable without Internet connection. The application 354 can be preloaded in the smart device 356 as well, available for download via a Wi-Fi connection of the smart device 356, or any other means of getting an application onto a smart device, as known in the art.

Application 354 can therefore access information which is independent of any central database storage of AR image labels. System 300B requires no dependence on Internet, cellular, or any type of online access. Application 354 does not need to upload/download/or integrate with other online databases in order to identify a PAR entity. Therefore, application 354 can work in areas where connectivity to the Internet is often unavailable. For example, the PAR application 354 can work on a cruise ship. Application 354 can coordinate well with social network applications that direct customers to specific vendors and can be used to augment central database information, rather than simply compete with the central database.

Figure 5:
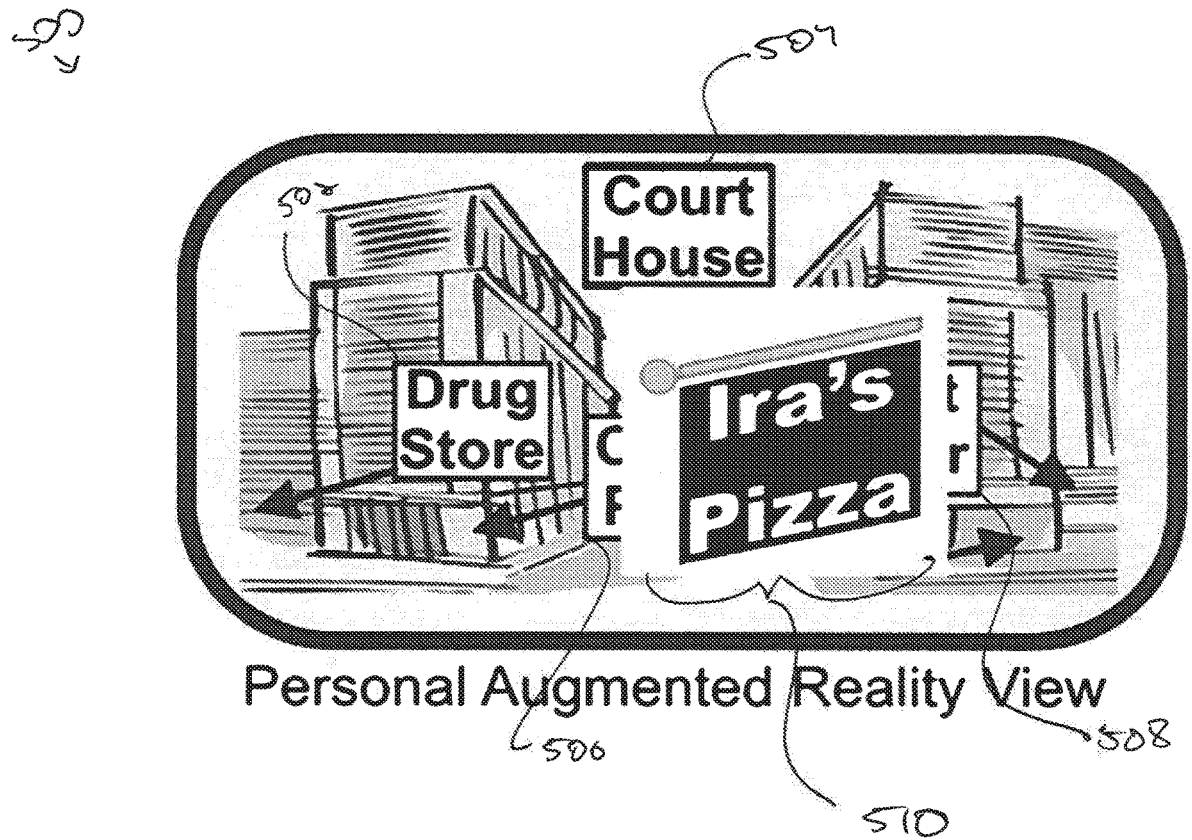
FIG. 5 shows an exemplary personal augmented reality view, according to an embodiment of the present disclosure.

For example, the central database may not be aware of today's special at Ira's Pizza. Ira's Pizza can transmit an advertisement through their emitor 200. An exemplary embodiment of this is shown in FIG. 5. An exemplary advertisement could be: "Chocolate Falafel" and that it is available in 12", 14" and 16" sizes for $9.99 up with pickles extra." Therefore, PAR users can be aware of additional advertisements beyond the advertisements of any central database. As shown view 500 of FIG. 5, existing advertisements 502, 504, 506, and 508 are included in the view. However, a PAR user is able to clearly see a personalized advertisement 510 for Ira's Pizza.

In some examples of the present disclosure, a healthcare embodiment of PAR can be provided which does not require cellular service. The emitor 200 can be worn as a badge or jewelry to designate the location and identity of an individual. For example, the emitor 200 can help locate an individual in need.

For example, emergency services can be called to an address by an amulet, without the need to provide additional knowledge of where the individual requiring services is. the emitor 200 can help locate an individual and can further emit critical patient information, links to information, blood type, medical history, next of kin, or other relevant healthcare data.

In some examples, a smart device 356 can collect information about the wellness of an individual, for example, heart rate and rhythm data. As detected by the smart device 356, or other remote intelligence, a person undergoing a medical problem can notify their location and their condition to nearby individuals. For example, a person entering atrial fibrillation, diabetic shock, or losing balance, etc. can designate their condition to nearby individuals, or EMT services, or hospital admission automatically on arrival.

In some examples, an individual entering a medical facility can be immediately directed by a emitor 200 of the medical facility. In some examples, an application 354 of an individual can detect specialty directions that the individual has set a filter for. In some examples the emitor 200 can send out special instructions for a particular person's application 354.

In some examples, a beacon can cause AR to focus or enlarge real sign. It may also relay emitors that are hidden from view, as in corridors, buildings, or alleys.

In some examples, a patient can have their key information on their bracelet, much like a medic alert, with no dependence on external systems or network access. Bracelet information can be repeated outside a patient's room. Beacons on room can indicate a level of need of the patients, which patients are in the most critical need, which patient is next in sequence, or where a patient is in a hall or ward.

In some examples of the present disclosure as used in the military or homeland security field hospitals, the present disclosure can provide for assigning triage priority. Backup battery power and persistent storage can be required in critical applications.

In some examples, a surgical tool can emit the tactile forces, temperature, and/or color at the point of a scalpel. The tool can direct an additional camera to provide an enlarged view or perspective of the activity.

In some examples, multiple surgeons and tools can communicate to coordinate timing and sequence during operations. For example, an EG, a cauterizing tool, a scalpel, and a clamp can all be by a common camera on a smart device 356. The application 354 can identify the different orientations and magnifications for each surgeon and/or tool. In some examples, each surgeon can see their own PAR application 354 on a smart device 356 which provides the correct orientation of the tools for each surgeon. For training, PAR application 354 can provide for an organ image to be clearly displayed in various orientations as an attached directional beacon is manipulated.

In some examples of the present disclosure, a social networking embodiment can be provided for. For example, a customer can be directed to a product or service that is attractive to a given affinity group based on the application 354 filtering for that affinity. For example, people with similar interest can select similar filters to meet at designated locations on a cruise ship (where internet access is expensive).

In other examples, members of an affinity group can find each other at a common point, by sensing the emitors 200 of peer members. In some examples, two individuals (who might be dating) can locate each other, and in other examples, a plurality of individuals can identify each other.

In some examples, an individual can wear a business card as an emitor 200 and advertise to those nearby—while those seeking the service, product, or expertise filter for their desires via the application 354. For example, a limousine service can thereby arrange for meeting a customer at an airport.

A person skilled in the art can readily understand that many of the examples discussed above with respect to the various embodiments can be implemented across a wide variety of activities, professions, and fields. Although the present disclosure references several particular implementations, many more implementations are enabled by the present disclosure.

Figure 4:
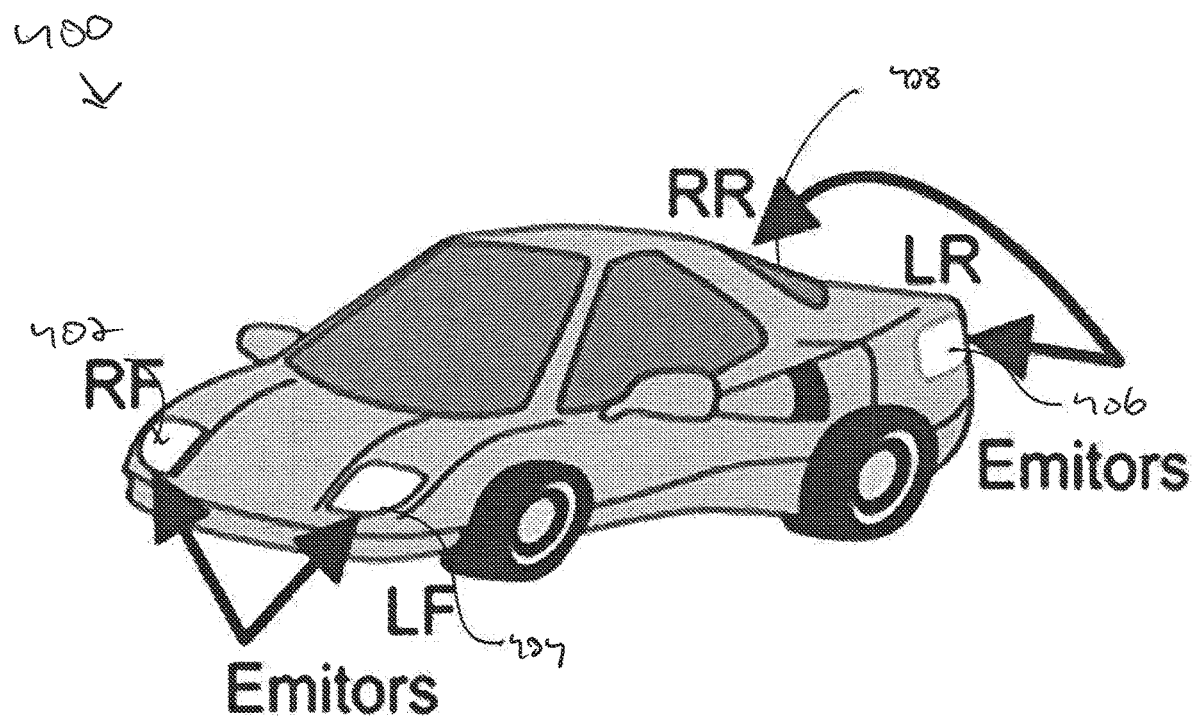
FIG. 4 shows an exemplary emitor system on an automobile, according to an embodiment of the present disclosure.

FIG. 4 demonstrates an embodiment of the present disclosure which is directed to an exemplary emitor array on a car 400. The car 400 can include a front right emitor 402; a front left emitor 404; a rear left emitor 406; and a rear right emitor 408. Such a car 400 can provide for additional vehicle safety.

Each of the principal LED lights in a vehicle can be an emitor 402, 404, 406, and 408 and can respectively emit "LF," "RF," "LR," and "RR" or any other location identifying information. In some examples, the emitors 402, 404, 406, and 408 can provide modulated data indicating the orientation and direction code (ODC) of a vehicle, even at great distance. In some examples, the emitors 402, 404, 406, and 408 can emit "01", "11," "00," and "10" to indicate their respective locations.

Typically, only 2 or 3 lights can be visible, such that in FIG. 4, RF, LF and LR are shown and RR is not visible. All 4 lights can only be visible from above.

In some examples, vehicle speed can be estimated where only a rough approximation of the distances between the lights is known. In FIG. 4, the vehicle can be oriented with the left front side nearest the camera and can move from left to right. This provides be 2 or 3 streams (4 if viewed from above) of 2-bit data each from emitors 402, 404, and 406. Emitors 402, 404, 406, and 408 can coordinate sequence to eliminate interference. Emitors 402, 404, 406, and 408 can still reveal orientation as "01" then "11" then "00" can be detected as a single pel in the camera from the multiple coordinated emitors 402, 404, 406, and 408 at a great distance. The sequence can be clockwise from above, or counterclockwise from below or if overturned/inverted (as in an airplane).

With VIN lookup, exact separations of emitors 402, 404, 406, and 408 can be known. For the purposes of identification and discrimination against other vehicles, all of part of a VIN number, state code, and/or license number can be included (continuously or periodically) as a string following the orientation and direction code. If each alphanumeric character in a license plate is defined by 5 bits and there are up to 6 characters, then 30 bits can define the license number. This can be 15 bits in addition to 2 bits per stream. Alternate emitors 402, 404, 406, and 408 can always be visible as the emitors 402, 404, 406, and 408 are the headlights and tail lights. Many conventional cars include LED technology for their headlights and tail lights.

FIG. 4 provides an example of a Directionally Sensitive Beacon—where different information can be emitted by one or more emitors 402, 404, 406, and 408 in an array such that the orientation of the receiver to the emitors 402, 404, 406, or 408 is determinant. Other applications can be: detection/identification of lost items, or any moving vehicle, aircraft, boats. Road signage can carry directions or best route to the nearest major city. Signs can be read differently according to the direction a user approaches the sign.

In other examples, the information can be relayed in and out of cars from emitors 402, 404, 406, and 408 or cameras that are on cell phones.

In some examples, the application 354 can present actual or synthesized image of the vehicle or object, in the correct orientation, for improved clarity. Once identified, telescopic enlargement and digitally enhanced images can be created by the AIK processor. In some examples, enhancement can provide for friend/foe identification or remote tracking of emitor-tagged contraband. Multiple cameras can coordinate for combined enhancement of a beacon-tagged item.

Figure 6:
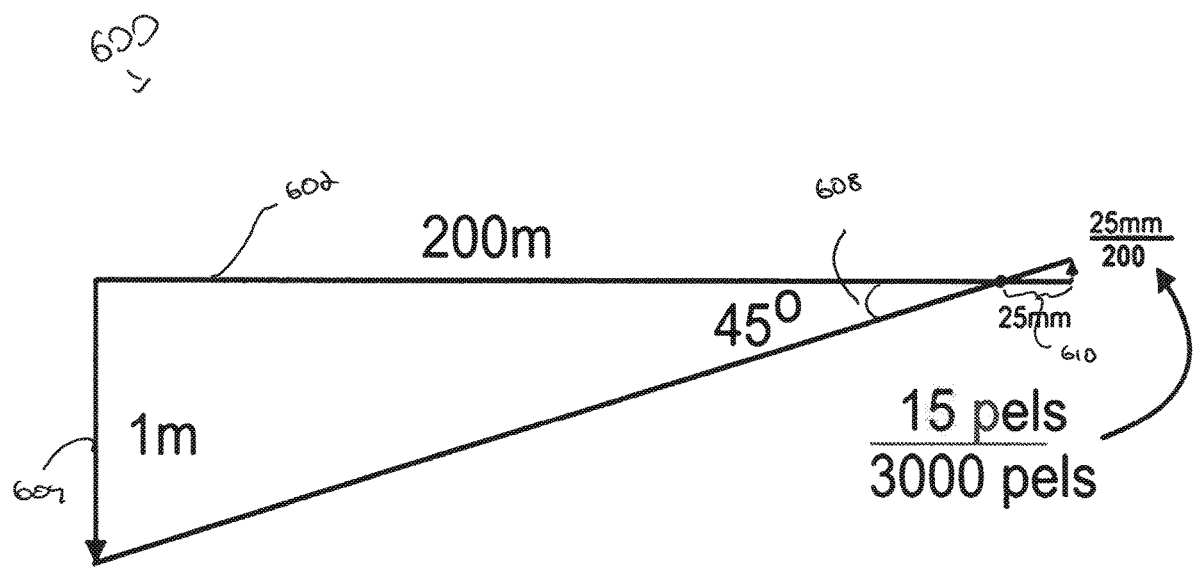
FIG. 6 shows an exemplary range calculation, according to an embodiment of the present disclosure.

FIG. 6 demonstrates how a PAR application 354 can provide for an exemplary range determination, according to an embodiment of the present disclosure. The range calculation 600 can include a first distance 602; distance between emitors 604; an angle of acceptance 608; and a second distance 610. Depending on the resolution, optics, and stabilization of the camera, the vehicle can be a significant distance away. FIG. 6 provides a range determination where the minimum distance 604 between the widest ODC emitors is 1 m and 1.2 million pels in an array of 4000×3000 (worst case camera on side) and 11 idle pels between the emitors with 2 pels min active (15 pels total). Therefore, this yields an angle of acceptance 608 of 15/3000 or 1/200. Net a distance of 1 m min×1/0.005 as the maximum distance 602 to the object or 200 meters. The minimum stopping distance of most cars is approximately 120 m at 120 km/hr (80 mph) with human reaction time included. 25 MM between pels can be 1 meter apart at 200 meters, as demonstrated in FIG. 6.

Next, a car can be uniquely identified by model, speed, direction, and range estimates such that a worst case stopping distance is still within the range when using this technique. The PAR library can overlay an image of the vehicle, even if it is otherwise obscured. There is no dependence on Internet access via cellular, Wi-Fi, or satellite; this technique can work independently at any point on the globe and can be easily adapted to driverless cars. As this example shows, only 2-3 emitors are needed to resolve the orientation of a user to any object. The object could be fixed and aligned to latitude and longitude, such that it would work for remotely locating navigational markers anywhere as in maritime channel and harbor markers. FIG. 6 shows that the ODC markers may be of different colors or IR and need not be visible to a user. In some examples of the present disclosure, sensors can detect texting, driverless, or alcohol.

Figure 7:
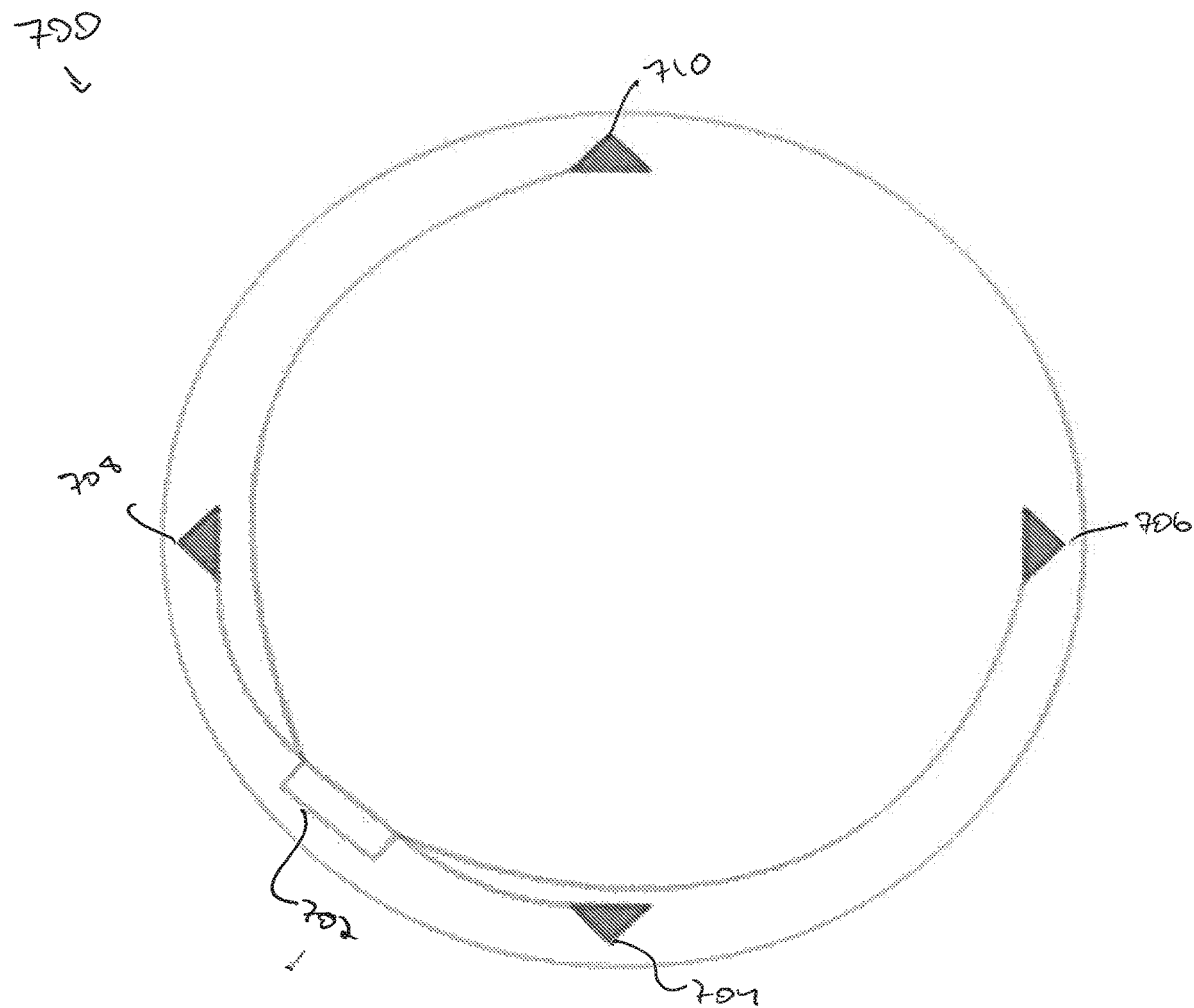
FIG. 7 shows an exemplary contact lens, according to an embodiment of the present disclosure.

FIG. 7 shows an exemplary contact lens 700, according to an embodiment of the present disclosure. Contact lens 700 can include a PAR receive 702; and four LED displays 704, 706, 708, and 710. Therefore, lens 700 provides a simple display with 4 LCD/led arrows 704, 706, 708, and 710. The PAR receiver 702 can be powered via light, passive RF or RFID, or a temperature differential power. The PAR receive 702 can receive commands from human or virtual intelligence. Lens 700 can be used for a pilot, foot soldier, or police or other profession, where commands can be delivered via low power laser, specifically to an individual with friend/foe identification.

Lens 700 can also provide for alphanumeric reception. The same technology can also work for less challenging "Heads-up" or Eyeglass displays. The contact lens could also contain an emitor (not pictured). In some examples, the emitor can provide GPS positioning data.

In some examples of the present disclosure, the beacons from a plurality of emitors can coordinate. For example, multiple affinity group members clustered together can each announce their destinations and proposed activities to other more via their emitors 200. In some examples, the communication can occur sequentially between members. In some examples, the communication can be emitted to distant members potentially joining so as to not interfere with the emitors in the affinity group members.

In some examples of the present disclosure, a group of scuba divers can communicate (even underwater) about which wreck or reef that they will be diving on and invite other nearby divers to join them. Beacons can work above or under water to locate dive buddies. Alternate colors or UV-IR-X or microwave (solid state maser) can change on emitors 200 to make them penetrate coverings more effectively.

The present disclosure also provides for an emitor-camera pair. An emitor 200 can designate the general information "Ira's Pizza." A camera paired to the emitor 200 can locate the individual relative to Ira's Pizza with a responding emitor (for example, each smart device 356 can also include an emitor 200) and give specific directions for the user to get to the restaurant—(e.g. walk 120 feet, turn right and go upstairs). Default refresh rates and transmission speed can shift following this pairing.

The present disclosure can also provide for the following additional embodiments. A person skilled in the art would readily understand how to integrate the present disclosure with the following examples:

- Use with transponder with directed microwave power through Wi-Fi (microwave energy captured for Emitor power—with automatic gain control and limiting on Wi-Fi module for reception of commands.
- Friend/Foe and individual Identification in military. Color can be used as differentiator.
- Emission of pre-coded information on passports for identification
- ID badge—can be coded for detection in certain areas. Visible by even low resolution security cameras
- Business card can emit streams of information
- Array of emitors with separate coordinated simultaneous data streams (for higher overall bandwidth).
- Emergency beacons—can operate as hub to control/relay through nearby Wi-Fi devices.
- Personal identifier. Preset code can be set via email and loaded to emitor. The code can later be detected by a smart device to authenticate individual. (For example, taxi drivers, service or delivery workers, dating applications, etc. can make use of this).
- License plates on car can be read at great distance or any angle and renewed online.
- Stolen vehicles can be located.
- Signage—speed signs, warning and directional assistance. Mailbox for robot postman in driverless car.
- Waterway buoys and signage can emit changing depth, or temperature of water
- Omnidirectional/unidirectional Coded transponder response of ships, vehicles or aircraft can communicate at great distances or under Internet command. Serial number identification can occur at great distances.
- Locating lost or misplaced items, children, or pets. Wi-Fi links can integrate with any SID, respond to a query with light, and report SID back to the query source.
- Electronic SmartStamp on letter. Such a stamp can emit a destination, a return address, the postage paid, routes with automated equipment to address, and provide a signals receipt. Such a SmartStamp can receive energy by RF. SmartStamps can be reusable and re-charged with postage online. SmartStamps can be recyclable, sold pre-charged, and/or be set for return postage to specified address.
- Unique Location of unsorted overnight shipped items in a pile, sorting of the items, identifying such items without vision of the item.
- Marking of consumer items with contents and condition of contents.
- Satellite direct communication to cell phones and all AIKs for homeland security mass warnings. Such a technology has no reliance on GPS or Internet, or any connectivity. A user can simply aim cell phone camera to a particular point in the sky to receive messaging. This can also be done for mass communication by aircraft, drones, and balloons.
- Secure emergency/military communication in absence of all traditional connectivity can be modulated laser powered by sunlight and intermittently broadcast to achieve brightness with low power. Narrow laser beams can be directed to specific to areas on the ground, and at specific periods of time to save power.

Designate movement or destination: digital modulated lasers can direct people to particular locations. For example, specific individuals filtered for directions. Such an embodiment would be optimal with contact lens receiver, as shown in FIG. 7.

In some examples of the present disclosure, the emitor can also provide for tracking of lost items, people, keys, pets, cell phones, stolen vehicles, trailers, etc. Emitor Beacon designates presence and orientation to observer—with multiple emitors, the ranging and direction of travel can be determined—as in the automotive example. (e.g. Fido is 200 feet away—in view shown on Smart Phone, and is traveling NW toward fire hydrant.) If only a single pel is detected, sequential ordering of emitors on a collar might still tell orientation. Cameras or weapons could be aimed as slave devices to the PAR system. Surveillance of a PAR beacon equipped vehicle could be achieved at great distance as per the example in FIG. 4. Useful for police, homeland security, military. Function could be embedded in car computer and made difficult to modify.

While various examples of the present invention have been described above, it should be understood that they have been presented by way of example only, and not limitation. Numerous changes to the disclosed examples can be made in accordance with the disclosure herein without departing from the spirit or scope of the invention. Thus, the breadth and scope of the present invention should not be limited by any of the above described examples. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A surgical system comprising:
a surgical tool communicatively coupled to an emitor configured to emit a pre-defined lighting sequence in time series; and
an augmented intelligence and knowledge (AIK) device configured to:
acquire a plurality of images of an area including the emitor, the plurality of images being acquired in the time series;
generate a base image of the area based at least in part on the acquired plurality of images of the area;
process the plurality of images to extract the pre-defined lighting sequence;
generate, based at least in part on the extracted pre-defined lighting sequence, an augmented reality label indicative of surgical information associated with the surgical tool; and
incorporate the augmented reality label into the base image to generate a modified image of the area to be displayed on a display device, the modified image including the augmented reality label.

2. The surgical system of claim 1, wherein the surgical tool includes at least one of a scalpel, a cauterizing tool, and a clamp.

3. The surgical system of claim 1, wherein the surgical information includes at least one of a tactile force applied to the surgical tool, a temperature or a color at a point of the surgical tool, an orientation of the surgical tool, and a timing for performing an activity with the surgical tool.

4. The surgical system of claim 1, further comprising the display device configured to display the modified base image.

5. The surgical system of claim 1, wherein the AIK device includes the display device.

6. The surgical system of claim 1, wherein the AIK device is a wearable device.

7. The surgical system of claim 1, wherein the AIK device is further configured to:
acquire in the plurality of images a directional beacon configured to emit a second pre-defined lighting sequence in time series;
process the plurality of images to extract the second pre-defined lighting sequence;
based at least in part on the extracted second pre-defined lighting sequence, generate an image of an organ positioned at an orientation; and
incorporate the image of the organ positioned at the orientation into the base image to generate the modified image.

8. The surgical system of claim 1, wherein the surgical tool is further configured to direct, based at least in part on the extracted pre-defined lighting sequence, a second camera to provide at least one of an enlarged view or a perspective view of activity of the surgical tool.

9. The surgical system of claim 1, wherein the emitor is configured to emit the pre-defined lighting sequence in response to receiving data signals associated with the AIK device.

10. The surgical system of claim 1, wherein the generated augmented reality label is a textual label, and wherein the modified image of the area includes the textual label.

11. The surgical system of claim 1, wherein the pre-defined lighting sequence is emitted via infrared light.

12. A surgical system comprising:
a first surgical tool communicatively coupled to a first emitor configured to emit a first pre-defined lighting sequence in time series, wherein the first emitor is associated with a first priority;
a second surgical tool communicatively coupled to a second emitor configured to emit a second pre-defined lighting sequence in time series, wherein the second emitor is associated with a second priority; and a first augmented intelligence and knowledge (AIK) device configured to:
  acquire a plurality of images of an area including the first emitor and the second emitor, the plurality of images being acquired in the time series;
  generate a base image of the area based at least in part on the acquired plurality of images of the area;
  process the plurality of images to extract the first pre-defined lighting sequence and the second pre-defined lighting sequence;
  generate, based at least in part on the extracted first pre-defined lighting sequence and the second pre-defined lighting sequence, one or more augmented reality labels indicative of a sequence of operation of the first surgical tool and the second surgical tool based on the first priority and the second priority; and
  incorporate the augmented reality label into the base image to generate a modified image of the area to be displayed on a display device, the modified image including the augmented reality label.

13. The surgical system of claim 12, wherein the first surgical tool and the second surgical tool include at least one of a scalpel, a cauterizing tool, and a clamp.

14. The surgical system of claim 12, wherein the AIK device is further configured to:
  identify, based at least in part on the extracted pre-defined lighting sequence, at least one of an orientation and a magnification for each of the first surgical tool and the second surgical tool.

15. The surgical system of claim 12, wherein the AIK device includes the display device.

16. An augmented intelligence and knowledge (AIK) device for displaying surgical information associated with a surgical tool, the AIK device comprising:
  a memory containing machine readable medium comprising machine executable code having stored thereon instructions; and
  a control system coupled to the memory comprising one or more processors, the control system configured to execute the machine executable code to cause the control system to:
    acquire a plurality of images of an area including an emitor configured to emit a pre-defined lighting sequence in time series, the plurality of images being acquired in the time series;
    generate a base image of the area based at least in part on the acquired plurality of images of the area;
    process the plurality of images to extract the pre-defined lighting sequence;
    generate, based at least in part on the extracted pre-defined lighting sequence, an augmented reality label indicative of the surgical information; and
    incorporate the augmented reality label into the base image to generate a modified image of the area to be displayed on a display device, the modified image including the augmented reality label.

17. The AIK device of claim 16, wherein the surgical information includes at least one of a tactile force applied to the surgical tool, a temperature or a color at a point of the surgical tool, an orientation of the surgical tool, and a timing for performing an activity with the surgical tool.

18. The AIK device of claim 16 further comprising a camera configured to acquire the area including the emitor.

19. The AIK device of claim 16 further comprising the display device, wherein the display device is configured to display the modified image of the area.

20. The AIK device of claim 16, wherein the control system is further configured to:
  acquire in the plurality of images a directional beacon configured to emit a second pre-defined lighting sequence in time series;
  process the plurality of images to extract the second pre-defined lighting sequence;
  based at least in part on the extracted second pre-defined lighting sequence, generate an image of an organ positioned at an orientation; and
  incorporate the image of the organ positioned at the orientation into the base image to generate the modified image.

* * * * *